Dec. 7, 1971   J. M. BARNETT ET AL   3,625,095
DRIVE FOR PIPE TONGS
Filed March 24, 1970   7 Sheets-Sheet 1

INVENTORS.
JAMES M. BARNETT
JOHN L. DICKMANN
BY MELVIN J. PALMER
John O. Evans, Jr.
ATTORNEY Dec. 7, 1971   J. M. BARNETT ET AL   3,625,095
DRIVE FOR PIPE TONGS
Filed March 24, 1970   7 Sheets-Sheet 5

INVENTORS.
JAMES M. BARNETT
JOHN L. DICKMANN
BY MELVIN J. PALMER
John O. Evans, Jr.
ATTORNEY Dec. 7, 1971   J. M. BARNETT ET AL   3,625,095
DRIVE FOR PIPE TONGS Filed March 24, 1970   7 Sheets-Sheet 5

INVENTORS.
JAMES M. BARNETT
JOHN L. DICKMANN
BY MELVIN J. PALMER
John O. Evans, Jr.
ATTORNEY Dec. 7, 1971   J. M. BARNETT ET AL   3,625,095

DRIVE FOR PIPE TONGS

Filed March 24, 1970   7 Sheets-Sheet 6

INVENTORS.
JAMES M. BARNETT
JOHN L. DICKMANN
BY MELVIN J. PALMER

John O. Evans, Jr.
ATTORNEY

United States Patent Office 3,625,095
Patented Dec. 7, 1971

3,625,095
DRIVE FOR PIPE TONGS
James M. Barnett, San Gabriel, John L. Dickmann, Whittier, and Melvin J. Palmer, Huntington Park, Calif., assignors to Byron Jackson Inc., Long Beach, Calif.
Filed Mar. 24, 1970, Ser. No. 22,293
Int. Cl. B25b 17/00, 23/02, 23/04
U.S. Cl. 81—57.18          28 Claims

ABSTRACT OF THE DISCLOSURE

A power tong for well pipe, in which a jaw carrying ring is rotatable in opposite directions by a rotatable jaw actuating cam ring, the cam ring being gear driven by a single hydraulic motor for low torque operation, a pair of hydraulic motors driving the cam ring for higher torque operation, and a ram actuated ratchet ring being provided to move the cam ring angularly for still higher torque operation.

BACKGROUND OF THE INVENTION

In the making up and breaking out of joints of pipe, such as the sections or stands of drill collars or drill pipe employed in the well known rotary drilling of oil and gas wells, the string of pipe extending into the well bore is held against rotation, while a stand of pipe to be added to or removed from the top of the drill string is supported in the derrick and rotated by a tong or wrench to effect the breaking out or the making up of the threaded joint or coupling. Likewise, lengths of well casing are added to a string of casing supported in the well bore by rotating the new length of casing by a tong.

Various power driven tongs have been provided to facilitate these tonging operations. Such power tongs have generally comprised a rotatable pipe gripping head or mechanism driven by a fluid or other motor. The making up of large diameter casing, drill collars, which are heavy lengths of drill pipe, and other drill pipe joints requires the application of a large torque to the tong head or pipe gripping mechanism. For example, to make up some of such joints as prescribed may require the application of up to 150,000 foot pounds of torque to the pipe stand. Breaking out drill pipe or drill collar joints also requires the application of a high torque to the stand of pipe.

Tong mechanisms for applying such high torque must nevertheless meet certain space limitations so that the use of excessively large components for strength purposes is undesirable. The usual gear drives for the rotatable pipe gripping mechanisms, however, have inherently involved large gears with massive teeth to transmit the necessary torque.

In addition, large motors to apply the necessary force are impractical and costly, and, in addition, pose speed problems unless complex change speed transmissions are employed in the drive to the rotatable tong head, whereby the pipe joints may be rapidly spun up or spun out at low torgue, such practice being known as "spinning," but the joints may be tightly finally made up or broken out at high torque, but low speed.

In order to apply the high torque forces to a pipe gripping head of a power tong, ratchet or intermittent rack and gear drives have been proposed but these have not been found satisfactory for various reasons.

To be effective and versatile, it is desirable that the power tong be capable of spinning a pipe at high speed, low torque, say when making or breaking drill collar and drill pipe joints, and to be capable of turning the pipe at low speed, high torque to finally make up or initially break out the pipe joint. However, if the tong is to be also used to make up casing joints, which include tapered threads, an intermediate torque capacity and lower speed are desirable. In addition, it often occurs on floating offshore drilling barges or vessels, that movement of the vessel caused by the waves causes the imposition of substantial side loading on the threaded joints, thereby giving rise to the further desirability of a power tong having a torque range which includes a torque capacity between the necessary spinning torque and the final make up and initial break out torque.

Gripping problems are encountered, moreover, in power tongs of the type wherein the radial force on the gripping jaws, which causes the jaws to grip the pipe, is a function of the torque applied to the jaw supporting structure by the power source. When the drive is relaxed during the shifting of a change speed transmission, the grip on the pipe is also relaxed temporarily and must be reapplied. Particularly, when high torque is being applied to the pipe, this temporary relaxation of the grip is believed to result in the inability of the jaws to properly reengage the pipe without causing damage to the pipe and reduced life of the usual gripping dies.

SUMMARY OF THE INVENTION

The present invention provides a power driven, rotary tong head which avoids the shortcomings of the prior art.

More particularly, the present invention provides a power driven rotary tong mechanism of the type wherein a cam ring is driven angularly to effect inward movement of pipe gripping jaws carried by an inner rotatable member or inner ring, the drive to the cam ring being selectively effected by rotary fluid motor means and a gear drive, for high speed low torque rotation of the cam ring, and for lower speed higher torque rotation of the cam ring, or by an angularly movable ratchet or over-running clutch ring which normally is disengaged from the cam ring, but which is operable to effectively engage the cam ring to move the latter angularly at low speed and high torque under the influence of pressure operated rams.

In accomplishing the foregoing, a ratchet ring is disposed about the cam ring, a number of wedging rollers being interposed between the ratchet ring and the cam ring and held in a neutral condition in pockets or wedging seats having opposing ramped walls, whereby actuation of the ratchet ring in one angular direction effects engagement of the rollers with one wall of the ramped seats, so that subsequent angular movement of the ratchet ring in the other direction will be imparted to the cam ring. The ratchet ring is angularly actuatable by double acting rams, so that a high torque may be applied to the ratchet ring to drive the cam ring, and hence the pipe gripping jaws and the inner ring or jaw support, in either angular direction, so as to tightly make up joints, on the one hand, and so as to break out tight joints, on the other hand. When the ratchet means are neutralized, with the rollers in the low portion of the ramped seats, the cam ring, and hence the inner jaw carrying ring, may be rotated at high speed and low torque to spin the pipe stand, by a low powered motor drive, the cam ring being free to rotate within the ratchet ring in either direction. With such a construction, the gearing which connects the cam ring to the motor drive, need not be so massive, since comparatively low torque forces are transmitted through the gear ring. This results in a smaller, more compact unit for a given torque capacity.

The motor drive involves a pair of reversible hydraulic motors, operable jointly or in parallel by fluid supplied from a pressure source, to apply torque to a pipe at an intermediate value, greater than the high speed spinning torque and less than the torque applied through the ratchet or clutch mechanism, and, in addition, only one of the motors may be operated to effect spinning of the pipe. The motor drive is adapted to be operated to apply angular force or torque to the gear ring which effects actuation of the jaws to their pipe gripping positions. When making up or breaking out drill pipe joints, the final make up torque or initial break out torque requirements may exceed the torque capacity of the fluid motor drive, so that the motor drive is stalled, but the motor drive, nevertheless, maintains the jaws in gripping engagement with the pipe, at the time that the higher torque is applied to the cam ring through the ratchet or clutch. Thus, an advantage of the present invention resides in the fact that the grip of the pipe by the jaws is not relaxed during the transition from the low torque mode to the high torque mode of operation. This results in less damage to the pipe by the usual pipe gripping dies and less damage or wear of the dies themselves.

When breaking out pipe joints, a further advantage stems from the fact that the motor drive, either one or both motors, is operable to effect gripping of the pipe by the gripping jaws, as well as to continuously apply torque, even though at a value less than is necessary to break out the joint. Thus, with the motor drive stalled, the large break out torque may be applied through the over-running clutch or ratchet, and when the torque supplied by the motor drive is sufficient to spin the pipe, the over-running clutch inherently allows the pipe to spin. Since no changes in the mode of operation are necessary in these circumstances, not only is the grip on the pipe maintained, but time is saved in each break out operation, such savings being very valuable due to the cumulative length of time which may be saved during numerous round trips of long drill strings.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

DESCRIPTION OF THE PREFERRED EMBODIMENT

As seen in the drawings, the tong assembly of the present invention includes a case or frame structure 1 comprising an upper case section 2 connected to a lower case section 3 by a suitable number of marginal fasteners 4. The case 1 is elongated in the illustrated embodiment and symmetrical at opposite sides of its longitudinal center. At its opposite ends, the case 1 has ears 5, whereby the assembly is adapted to be suitably supported in a position over a well bore being drilled by the usual drilling rig. The assembly may also be supported so as to be moved off to one side of the well bore when desired, as is well known. In any event, however, the supporting means for the assembly should be adapted to support the assembly at the desired elevation, as well as to anchor the housing against reactive rotation when the tong assembly, as will be hereinafter described, is operated to rotate a pipe P, or joint portion of the pipe P, in either direction, during the making or breaking of joints in the pipe P, during round-tripping of a well drill string, or during the making up of joints or couplings in the casing as the casing is being run into the well bore.

Figure 4:
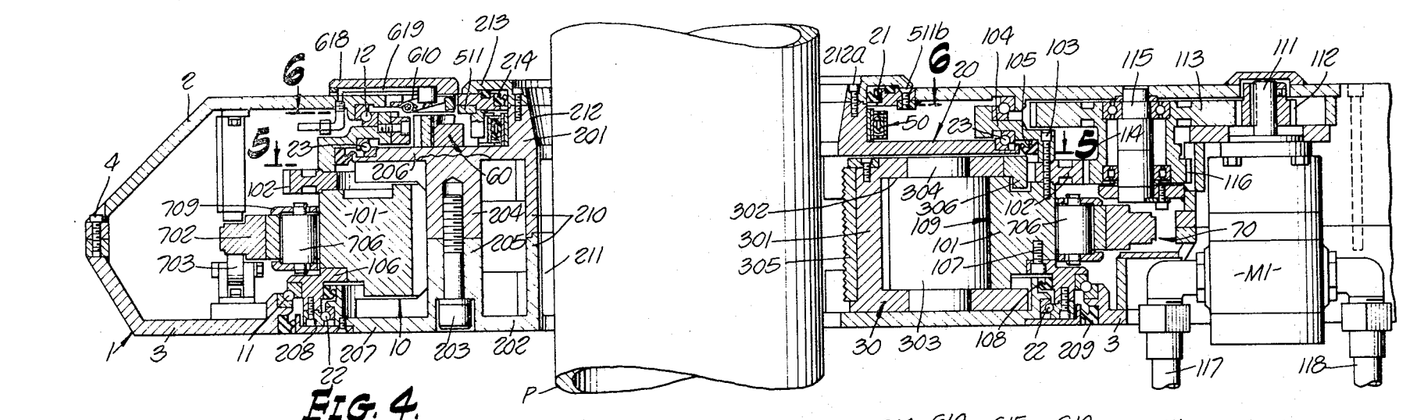
FIG. 4 is a view in vertical section, as taken on the line 4—4 of FIG. 3.

Within the case 1, the tong mechanism, as is well known in the field of well pipe tongs of the type here involved, includes an outer ring assembly 10 revolvably supported in the case between a lower annular bearing assembly 11 and an upper bearing assembly 12. Concentrically disposed in the outer ring assembly is an inner ring assembly 20 which is rotatably disposed in a central opening 21 in the upper case section 2 and relatively rotatably mounted in the outer ring assembly 10 in a lower annular bearing assembly 22 and an upper annular bearing assembly 23. The inner ring carries a number of radially shiftable gripping jaws 30 adapted to be cammed radially between retracted positions (FIGS. 4 and 5) and projected, pipe gripping positions (FIG. 11) responsive to rotation of the outer ring assembly 10, in either direction, relative to the inner ring assembly 20. The ring assemblies 10 and 20 rotate together after the pipe P has been gripped and prevents further inward movement of the jaws 30 into gripping engagement with the pipe P, so that the pipe P is then caused to revolve.

Motor means M1 and M2 are provided, in the usual form of reversible hydraulic motor means, to effect rotation of the outer ring assembly 10 in either direction. In addition, brake means 50 are provided to initially hold the inner ring assembly 20 against rotation with the outer ring assembly 10, until the jaws 30 grip the pipe P, and reverse stop means 60 are provided to cause the outer ring 10 and the inner ring 20 to rotate in unison in a reverse direction when the jaws 30 are retracted from pipe gripping positions.

Tong assemblies, as thus far described, insofar as the operating mechanism is concerned, are substantially conventional, and such assemblies are employed to make and break joints in well drill pipe, drill collars, casing, tubing and sucker rods. The present invention, however, is concerned with adapting such an assembly to apply high final make up or initial break out torque to pipe, particularly such as large drill collars and drill pipe, and to apply less torque to casing to expeditiously make up tapered thread casing joints, without resorting to massive components in the power train, while permitting the tong assembly, also, to spin the pipe in or out at high speed, and without resorting to large and complex change speed mechanisms in the power train.

In accomplishing these general objectives, the invention provides ratchet means or over-running clutch means 70 operable to effect angular movement of the outer ring assembly 10 in either direction, after the jaws 30 are engaged with the pipe P, under the influence of double acting hydraulic ram means 80, so that high torque is transmitted to the outer ring 10 and to the jaws 30 to rotate the pipe, without requiring that the high torque be produced by the motor means M1 and M2, or that such high torque be transmitted through the usual drive from the motors M1 and M2, or either of them, to the outer ring assembly 10. As a result, a tong assembly with extremely high make up or break out torque capacity can be produced which is comparatively small, simple, effective, and durable.

More particularly, the outer ring assembly includes an annular body portion 101 of rigid construction, on top of which is a ring gear portion 102. In the illustrated embodiment, the ring gear portion 102 is formed as a separate element, secured to the body portion 101 by suitable fasteners 103. Also secured to the body 101 by the fasteners 103, is an upwardly and inwardly extended annular bearing plate or flange 104 which accommodates the previously mentioned bearing assemblies 12 and 23 as well as a seal ring 105 which prevents the entry of foreign matter into the case 1 at the bearing 23. Another annular bearing plate or flange 106 is connected to the outer ring body 101, by fasteners 107 and accommodates the bearings 11 and 22, as well as a lower seal ring 108 between the inner ring 20 and the outer ring 10.

At its inner periphery, the outer ring body 101 is formed with a suitable camming surface 109, including, in equally angularly spaced relation, pairs of oppositely arched ramp surfaces 109a and 109b and an intermediate depression 109c. These pairs of ramped surfaces and depressions are three in number, since the tong assembly involves three equally spaced jaws 30 carried by the inner ring 20 and adapted to be actuated by the outer ring 10. At its upper side, the outer ring 10 is cut away to provide an outer cam surface 110 which conforms to the inner cam surface 109 and has similar opposed ramps 110a, 110b and a projection 110c.

As previously indicated, the motors M1 and M2 constitute means for rotating the outer ring 10 in either direction. Hence, each of these motors is mounted on the case 1 adjacent and end thereof and has, as exemplified in FIG. 4, an output shaft 111 on which is a drive gear 112. This gear drives a larger gear 113 which has a hub 114 rotatably supported on a shaft 115 supported by the upper case section 2. On the hub 114 is a gear 116 which is in mesh with the ring gear section 102 of the outer ring 10. Fluid may be supplied to the motors through either of a pair of conduits 117 and 118 to effect drive of the motors and, correspondingly, the outer ring 10, in either direction, and in a manner later to be described, so as to be jointly operable or so that only one of the motors is operable to drive the outer ring 10.

The inner ring 20 is disposed concentrically within the outer ring 10 and includes an upper ring section 201 and a lower ring section 202 joined at a number of circumferentially spaced locations by fasteners 203 in axially extended opposed posts 204 on the ring section 201 and 205 on the ring section 202. The upper ring section 201 has a top flange or plate 206 extending outwardly to accommodate the bearing 23, this plate 206 also being engaged by the aforementioned seal 105. The lower inner ring section 202 also has an outwardly extended flange or plate 207 to which is secured an annular extension 208, whereby the flange 207 and extension 208 engage the seal ring 108 and also engage another seal ring 209 carried by the lower case section 3.

The inner ring sections 201 and 202 have inner marginal webs 210 (see FIG. 5), in angularly spaced relation about the central opening through the assembly, which define windows 211 opening radially to accommodate the jaws 30 as they are actuated into the central opening to engage the pipe P, as will be later described. In order to facilitate the stabbing of pipe into this central opening, the upper inner surface of the inner ring section 210 flares outwardly at 212 to form a guide. To the top of the inner ring section is attached, by fasteners 212a, a plate 213 which forms an upward extension of the guide surface 212, extends outwardly into overlying relation to the top of the case section 2, and accommodates a seal ring 214.

Figure 5:
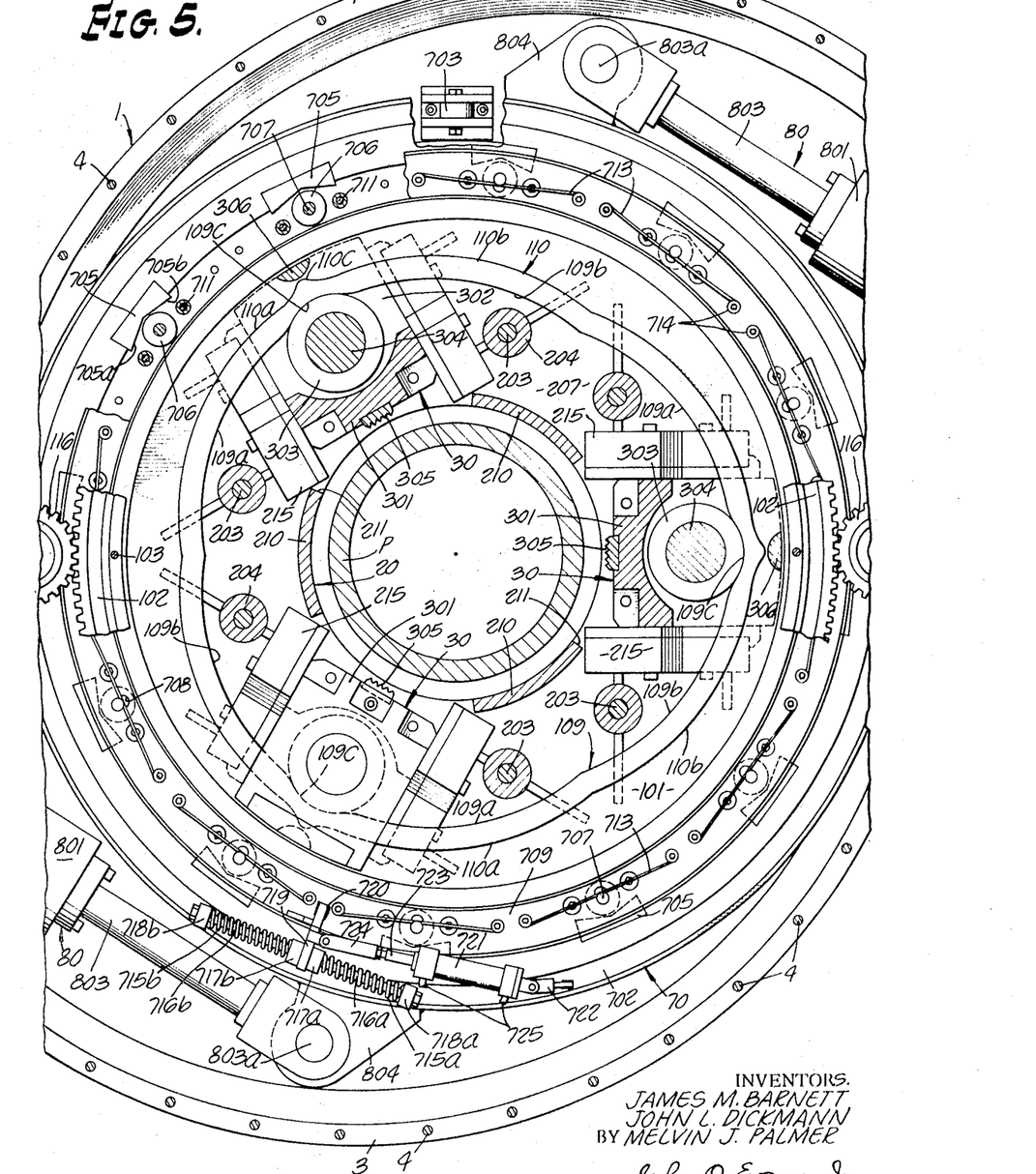
FIG. 5 is an enlarged fragmentary view in horizontal section, as taken on the line 5—5 of FIG. 4.
Figure 11:
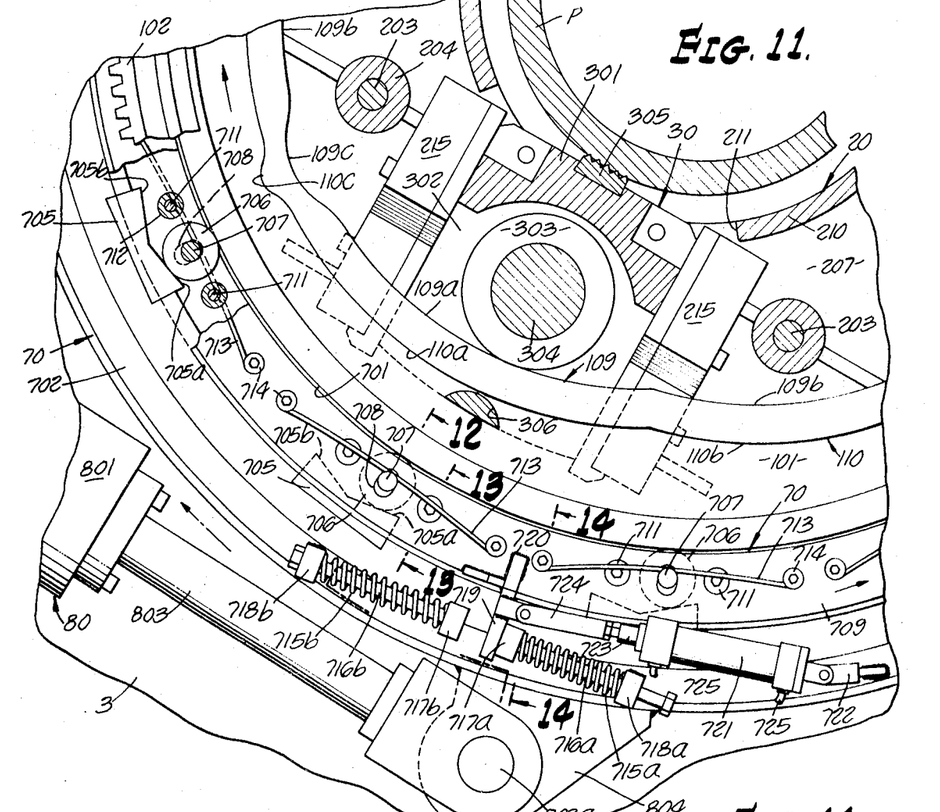
FIG. 11 is an enlarged fragmentary detail view in horizontal section, showing a portion of the operating mechanism of FIG. 5, with the over-running clutch means engaged to enable the application of final make up torque to the pipe.
Figure 12:
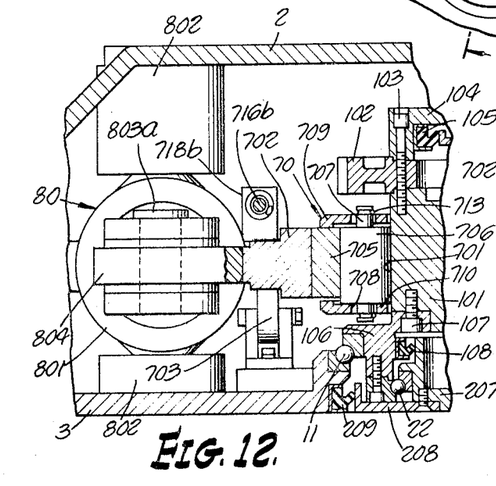
FIG. 12 is a fragmentary detail view in vertical section, as taken on the line 12—12 of FIG. 11.

As best seen in FIGS. 5 and 11, the jaws are radially aligned with the windows 211 and are supported for radial reciprocation between opposed parallel guides 215, these guides being welded or otherwise rigidly supported between the upper and lower flanges 206 and 207 of the inner ring 20.

Each jaw 30 comprises a block or body 301 provided with a horizontally outwardly opening slot 302 in which is revolvably mounted a cam follower or roller 303 rotatably supported in the top and bottom walls of the jaw body 301 on a shaft 304. In the inner face of each jaw body is at least one toothed pipe gripping die 305 adapted to bite into the pipe P and grip the same upon movement of the jaws 30 inwardly. Such inward movement of the jaws 30 is effected by either of the cam surfaces 109a or 109b when the outer ring 10, having the cam surfaces 109a and 109b thereon, is moved angularly relative to the jaw carrying inner ring 20 and the rollers ride out of the depressions 109c. Retraction of the jaws 30 is effected by a cam follower lug 306 on each jaw 30 which extends downwardly outside of the cam surface 110 to slidably engage the portions 110a, 110b or 110c.

Figure 6:
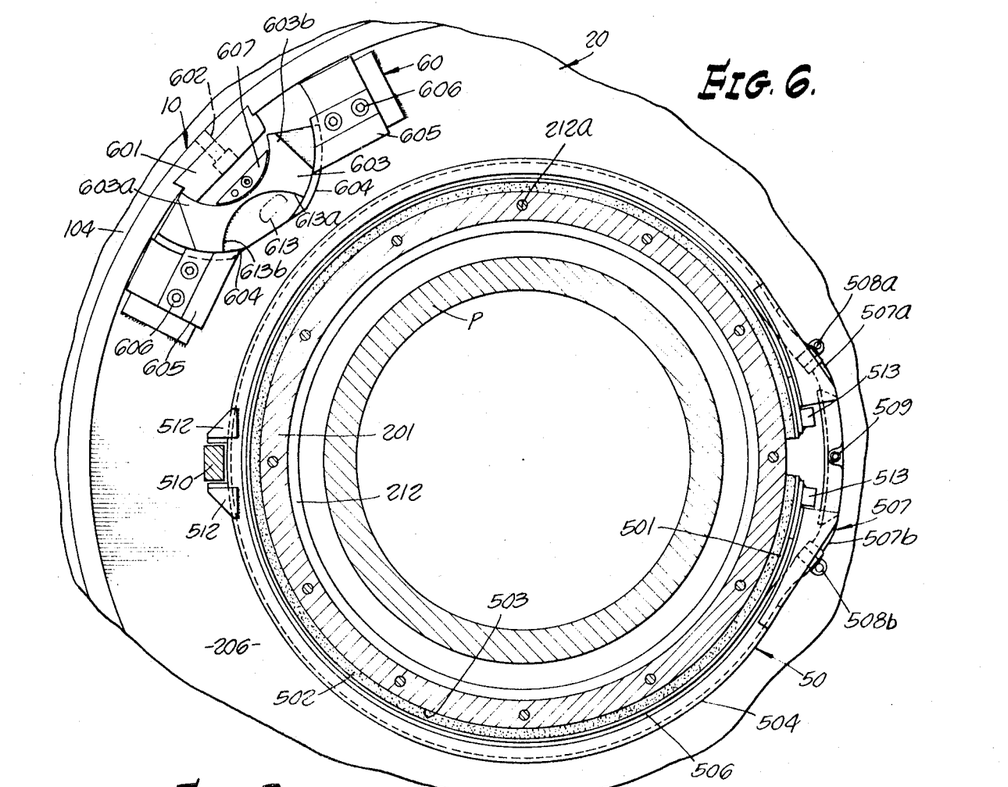
FIG. 6 is an enlarged fragmentary view in horizontal section, as taken on the line 6—6 of FIG. 4.
Figures 7, 9:
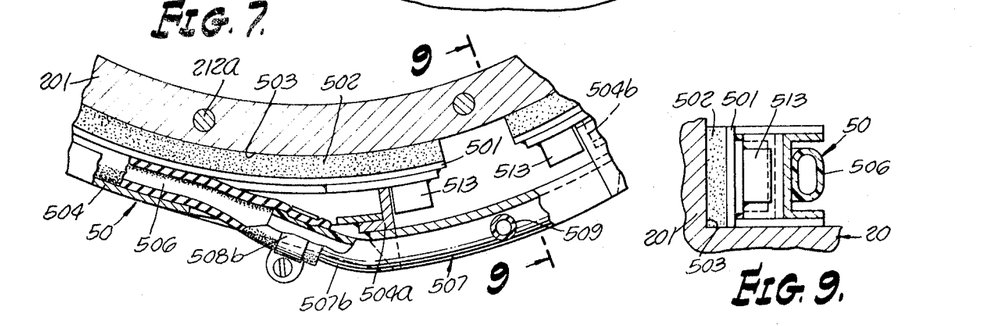
FIG. 7 is an enlarged fragmentary detail view, showing portions of the brake mechanism.
FIG. 9 is a view in vertical section, as taken on the line 9—9 of FIG. 7.
Figure 8:
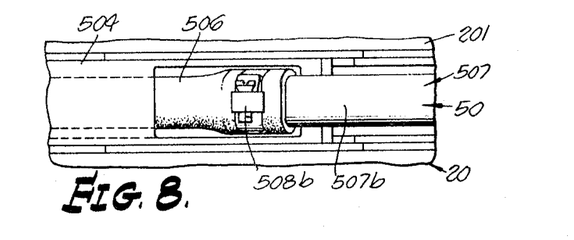
FIG. 8 is a fragmentary view in side elevation, showing one of the hydraulic connections of the brake mechanisms in FIG. 9.

As previously indicated, brake means 50, best seen in FIGS. 6 through 10, are employed to prevent initial rotation of the inner ring 20, so that relative rotation of the outer ring 10 will effect inward camming of the jaws 30 by the cam surface 109. This brake means 50 includes a brake band 501, having friction lining material 502, which extends circumferentially about a cylindrical surface 503 on the inner ring section 201 above the flange 206. This brake band 501 is disposed within a circumferentially extended channel member 504 which houses a circumferentially extended pressure responsive tube 506. The band 501, channel member 504, and tube 506 extend substantially about the entire circumference of the brake surface 503, as best seen in FIGS. 6 and 7, and braking effort is applied throughout substantially the entire circumferential extent of the band 501. In order to admit fluid under pressure to the tube 504 a fitting 507, which bridges the gap between the ends of the channel member 504, has ends 507a and 507b turned inwardly for connection by clamps 508a and 508b to the tube 506. Thus, fluid pressure entering the fitting at an inlet 509 is applied to the tube 506 to expand it and force the brake lining 502 against the braking surface 503.

Anchorage of the brake means 50 against rotation with the inner ring 20 is provided by a stop lug 510 which is fastened (FIG. 10) to the top of the upper case section 2 by a weld 501a connecting it to an annulus 511a forming the inner marginal section of the top wall of the case 2 and which is secured by fasteners 511b to a support ring 511 which is welded to the top wall of the case 2, to allow removal of the annulus 511a for assembly or service of the brake means 50. The lug 510 depends between a pair of outwardly projecting anchor lugs 512 which are welded or otherwise affixed to the channel member 504 at a suitable location. In order to anchor the opposite ends of the brake band 501, so that it is effective to brake the inner ring 20 in either direction, the band 501 (FIGS. 7 and 9) has anchor lugs 513 welded or otherwise affixed to the ends of the band 501 and projecting outwardly for abutting engagement with the ends 504a and 504b of the channel member 504. Without need for further description, the brake means 50, which, per se, forms no part of the present invention, will be understood to be operable to prevent rotation of the inner ring 20 until the jaws 30 engage the pipe P, but, thereafter, the inner ring 20 will rotate with the outer ring 10, and the magnitude of the pressure applied to the tube 506 then affects only the radial force applied to the jaws 30 by the cam surface 109 to prevent slippage of the jaws about the pipe P.

As previously indicated, reverse stop means 60 are provided which are adapted to overcome the braking effect of the brake means 50 when the jaws 30 are being retracted or opened, so that the inner ring 20 will rotate with the outer ring 10 when the cam rollers 303 move back into the depressions 109c, following operation of the tong in either direction.

Figure 1:
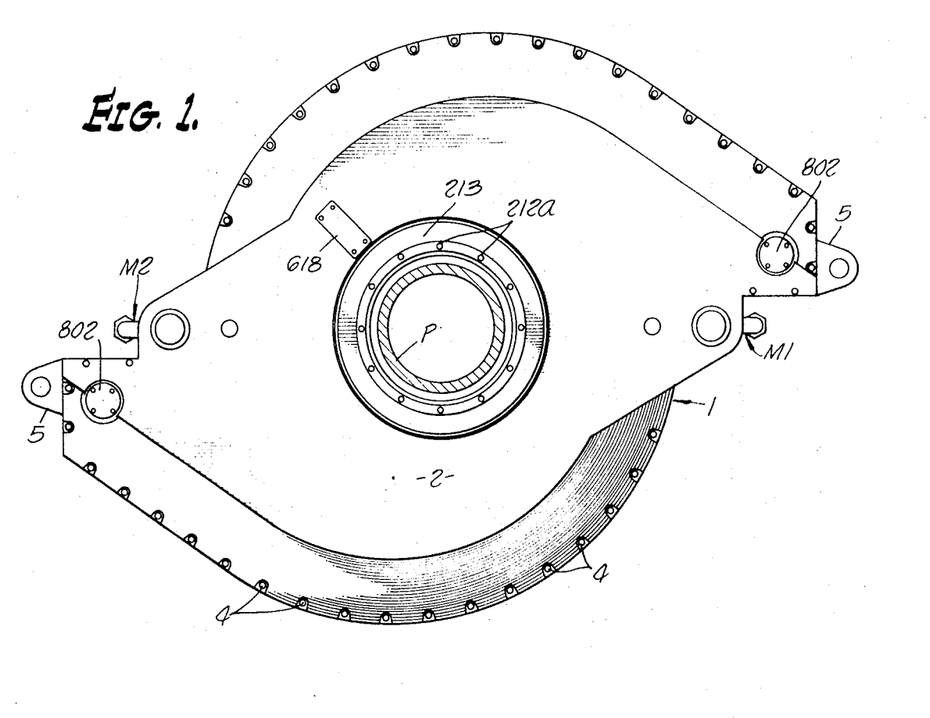
FIG. 1 is a top plan view of a pipe tong made in accordance with the invention.
Figure 2:
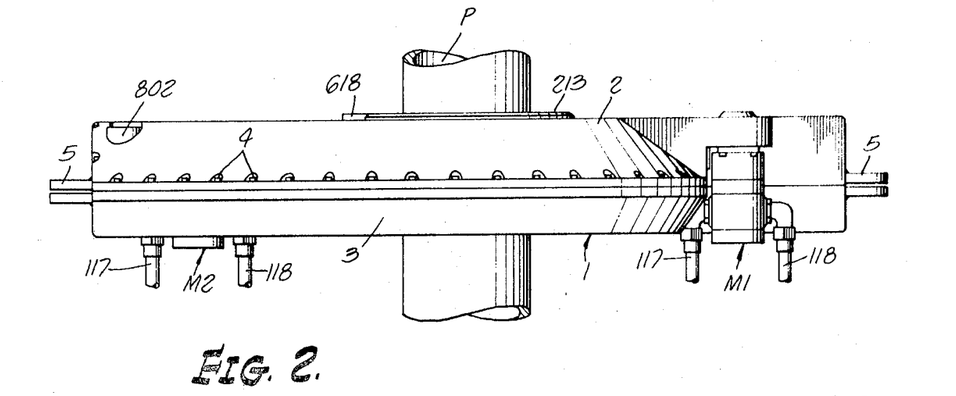
FIG. 2 is a side elevation thereof.
Figure 3:
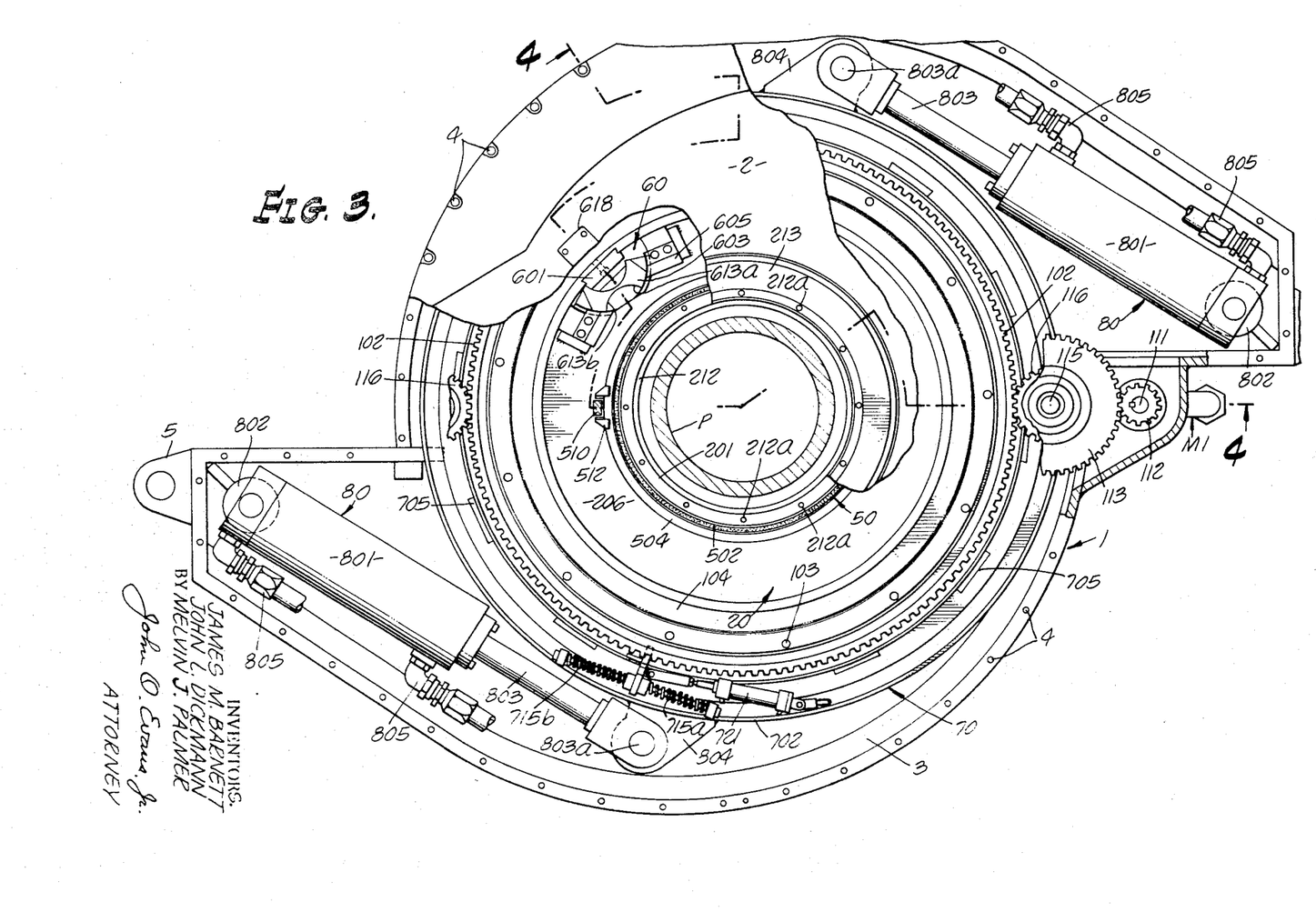
FIG. 3 is an enlarged top view, with parts broken away to illustrate portions of the drive mechanism.
Figure 10:
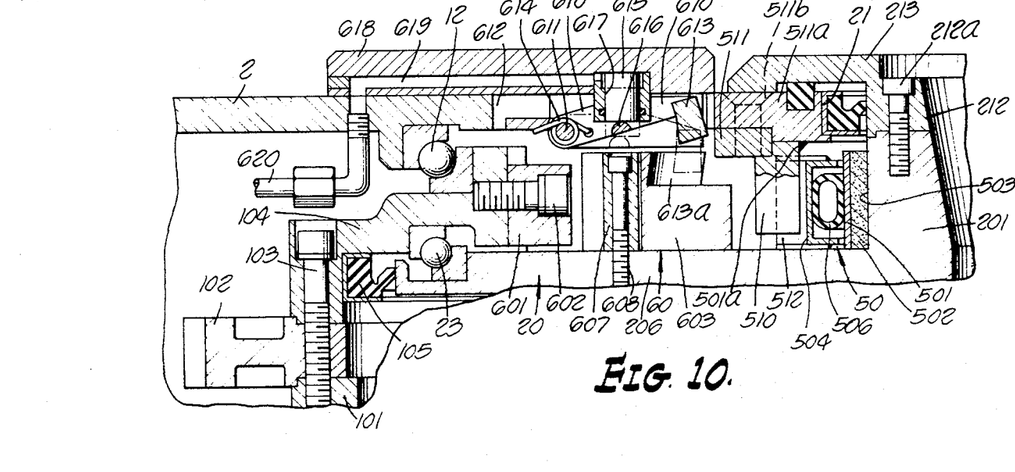
FIG. 10 is an enlarged fragmentary detail view in vertical section, showing the reverse stop mechanism, as seen in FIG. 4, with the reverse stop shifter shown in broken lines in a position to shift the reverse stop.

Such reverse stop means 60 will be best understood from reference to FIGS. 3, 6 and 10 as including a traveling stop 601 suitably affixed to the flange portion 104 of the outer ring 10 by a fastener 602, and a reversible stop 603 carried by the top flange 206 of the inner ring 20. More particularly, the reversible stop 603 is in the form of an arched body having outer marginal base flanges 604 which are slidably disposed beneath overlying portions of blocks 605 which are fastened by screws 606 or otherwise rigidly affixed to the flange 206 of the inner ring 20. The stop body 603 is arcuately movable about a centering guide 607 which is affixed to the flange 206 of the inner ring 20 by fasteners 608. At its ends, the stop body has a portion 603a and a portion 603b, which portions are alternately positionable in the path of travel of the traveling stop 601. In FIG. 6, for example, the traveling stop 601 is abutting against the portion 603a of the stop body 603, so that rotation of the outer ring 10 in a counterclockwise direction will cause corresponding rotation of the inner ring 20, but the outer ring 10 is free to rotate in a clockwise direction relative to the inner ring 20. Under these circumstances, such rotation of the outer ring 10 will cause cam surfaces 109a to cam the jaws 30 inwardly to grip the pipe, but when the outer ring is reversed, to open the jaws 30, rotation of the outer ring 10 relative to the inner ring 20 will be arrested upon engagement of the traveling stop 601 with the portion 603a of the stop body 603, at which time the jaws 30 are fully retracted, and the rollers 303 of the jaws will be in the depressions 109c of the cam surface 109. Thus, the stop means 60 is conditioned as shown so that the assembly will function to make up pipe joints.

In order to break out pipe joints, it is necessary to reverse the position of the reverse stop body 603 to withdraw portion 603a from the path of the traveling stop and place the portion 603b in such path. A reverse stop shifter (FIG. 10) is provided for this purpose, including a lever 610 pivotally mounted at one end on a shaft 611 which is suitably supported in a window 612 in the top of the case 2. At its other end, the lever 610 has a downwardly extended lug 613. A spring 614 normally elevates the lever 610 to the full line position of FIG. 10. A fluid pressure operated piston 615 engageable with an abutment 616 on the lever 610 is adapted to depress the lever to the broken line position of FIG. 10. This piston 615 is reciprocable in a chamber 617 provided in a plate 618 which is attached to the top of the case 2 and provides a pressure fluid port 619, connectable to a source conduit 620. Pressure fluid, such as air, depresses the lug 613, when it is desired that the position of the reverse stop body 603 be changed from the illustrated make up position to the alternate break out position.

The stop body 603 has an arcuate depression providing stop portions 613a and 613b one of which is disposed to engage the lug 613, when it is depressed, to rock the stop body 603 to the alternate position following continued unitized rotation of the outer ring 10 and inner ring 20 in a jaw-opening direction, after the traveling stop 601 contacts an end 603a or 603b of the stop body 603, as the case may be, depending upon whether the assembly is making up or breaking joints.

The tong assembly, as thus far described, is well suited to making up or breaking out joints which do not require the application of high torque either in the initial or final stages, and if desired, the motors M1 and M2 may be connected to a source of hydraulic motor fluid for selective series operation, for high speed, low torque spinning of the pipe P, or parallel operation, for lower speed, higher torque operation, as will be later more fully described.

In either event, according to a salient feature of the invention, the ratchet or over-running clutch means 70 and actuator means 80 therefor, now to be described, enable the application of high torque to the outer ring 10 in either direction.

Figures 13, 14:
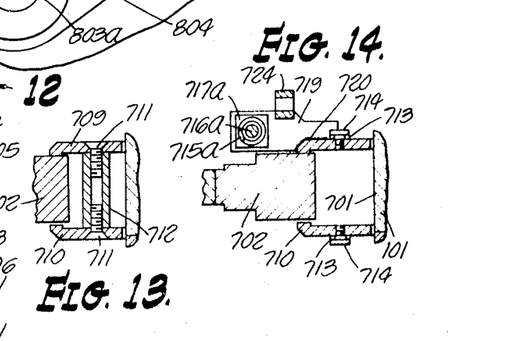
FIG. 13 is a fragmentary detail view in vertical section, as taken on the line 13—13 of FIG. 11.
FIG. 14 is a fragmentary detail view in vertical section, as taken on the line 14—14 of FIG. 11.

With particular reference to FIGS. 3, 5, and 11–14, it will be noted that the ratchet means 70 extends circumferentially about a cylindrical outer wall 701 of the cam ring or body portion 101 of the outer ring 10. An annular ratchet body or ring 702 is supported in the lower case section 3 on a suitable number of circumferentially spaced rollers 703 which are mounted for rotation on horizontal axes in roller supporting brackets mounted on the bottom of the case section 3. At a plurality of angularly spaced locations, the ratchet or clutch ring 702 is provided with inserts 705 having oppositely ramped seats 705a and 705b facing the annular wall 701 of the outer ring body 101 in radially outwardly spaced relation thereto. Ratchet or clutch rollers 706 are interposed between the cam ring surface 701 and the inserts 705, these rollers being mounted on shafts 707 which extend vertically through radial slots 708 in vertically spaced roller carrying rings 709 and 710. These rings 709 and 710, as seen in FIG. 13, are interconnected by fasteners 711 which are engaged in the opposite ends of a spacer 712 disposed between the rings 709 and 710. The upper ring 709, at its outer periphery, rests upon the top of the ratchet or clutch ring 702, and the rollers 706 rest on the lower carrier ring 710.

In order to normally bias the rollers 706 away from the cylindrical wall 701 of the cam ring 101, the upper and lower ends of the roller shafts 707 extend through the radially elongated slots 708 in the respective carrier rings 709 and 710, and are engaged by elongated wire springs 713, intermediate the ends of the springs 713 which are connected to the carrier rings 709 and 710 by fasteners 714.

Centering means are provided for normally orienting the roller carrier ring assembly with the rollers 706 centralized between the ramped seats 705a and 705b, with the rollers fully retracted to enable free rotation of the outer ring 10 relative to the ratchet or clutch ring 702. This centering means includes opposing springs 715a and 715b which respectively act to relatively move the carrier ring assembly and the ratchet ring in opposite directions when they are angularly displaced with the rollers 706 engaged with one of the ramp surfaces 705a and 705b. To accomplish this, each of the spring 715a and 715b is disposed about a supporting rod 716a and 716b having a spring seat 717a and 717b at their adjacent ends, and slidably extending through opposing spring seats 718a and 718b, these latter seats being both affixed to the ratchet ring 702 in angularly spaced relation. Disposed between the spring seats 717a and 717b is a pusher arm 719 which is affixed at 720 to the upper roller carrier ring 709. In the normal condition shown in FIG. 5, for example, the springs 715a and 715b act on the pusher arm 719 to centralize it with respect to the springs, and, thus, to centralize the rollers 706 in the inserts 705.

Clutch engaging means are provided for effecting relative angular movement of the ratchet ring 702 and the roller carrier rings 709, 710, including a cylinder 721 pivotally connected at 722 to the ratchet ring 702, and an extensible and retractable rod 723 extending from the cylinder 721 and longitudinally adjustably and pivotally connected by a connector 724 to the pusher arm 720 and, thus, to roller carrier ring 709. Fluid under pressure, admitted to the cylinder 721 through one of the pair of conduits 725 will effect extension or retraction of the rod 723, so that the rollers will be engaged with one or the other of the ramped seats 705a and 705b and with the clutch surface 701 of the outer ring 10, responsive to angular movement of the roller carrier rings 709, 710 in one direction, and the ratchet or clutch means 70 is then in engagement. When the ratchet or clutch means is thus engaged, angular movement of the ratchet or clutch ring 702 in one direction will be transmitted to the outer ring body or cam ring 101.

The actuator means 80, referred to above, are adapted to effect such angular movement of the ratchet or clutch ring 702. Accordingly, the actuator means 80, includes one or more, preferably diametrically opposite pressure operated devices, including cylinder 801 pivotally connected at 802 in the case 1, and having extensible and retracable rods 803 which are pivotally connected at 803a to arms 804 which are welded or otherwise provided on the outer periphery of the ratchet or clutch ring 702. Pressure fluid connections 805 are provided for each cylinder 801, so that it is double acting in the usual manner, to effect clockwise rotation of the ratchet or clutch ring 702 if the rods 803 are initially extended, or to effect counter-clockwise rotation of the ratchet or clutch ring 702 if the rods 803 are initially retracted. It should be noted, at this point, that the initial condition of the actuator rods 803 is determined by whether pipe joints are to be made up or broken out by the tong assembly, and the initial position of the rods 803, is established by applying pressure to the cylinder 801 to move the rods to the desired positions while the actuator cylinder 721 and rod 723 are in neutral, with the springs 715a and 715b neutralizing the rollers 706. At this time, extension or retraction of the actuator rods 803 simply effects idle angular movement of the ratchet or clutch ring 702 and the roller carrying rings 709, 710, relative to the stationary outer ring 10.

As previously indicated, drive of the pipe gripping assembly in either direction is, in accordance with a feature of the invention, accomplished by supplying fluid under pressure effectively to only one of the motors M1 and M2 for highest speed, lowest torque operation of the tong, to both of the motors M1 and M2, simultaneously, for lower speed, but higher torque operation of the tong, and with one or both of the motors M1 and M2 in a stalled condition, by applying fluid under pressure to the actuator means 80 to move the clutch ring 702 angularly in the appropriate direction.

Figure 15:
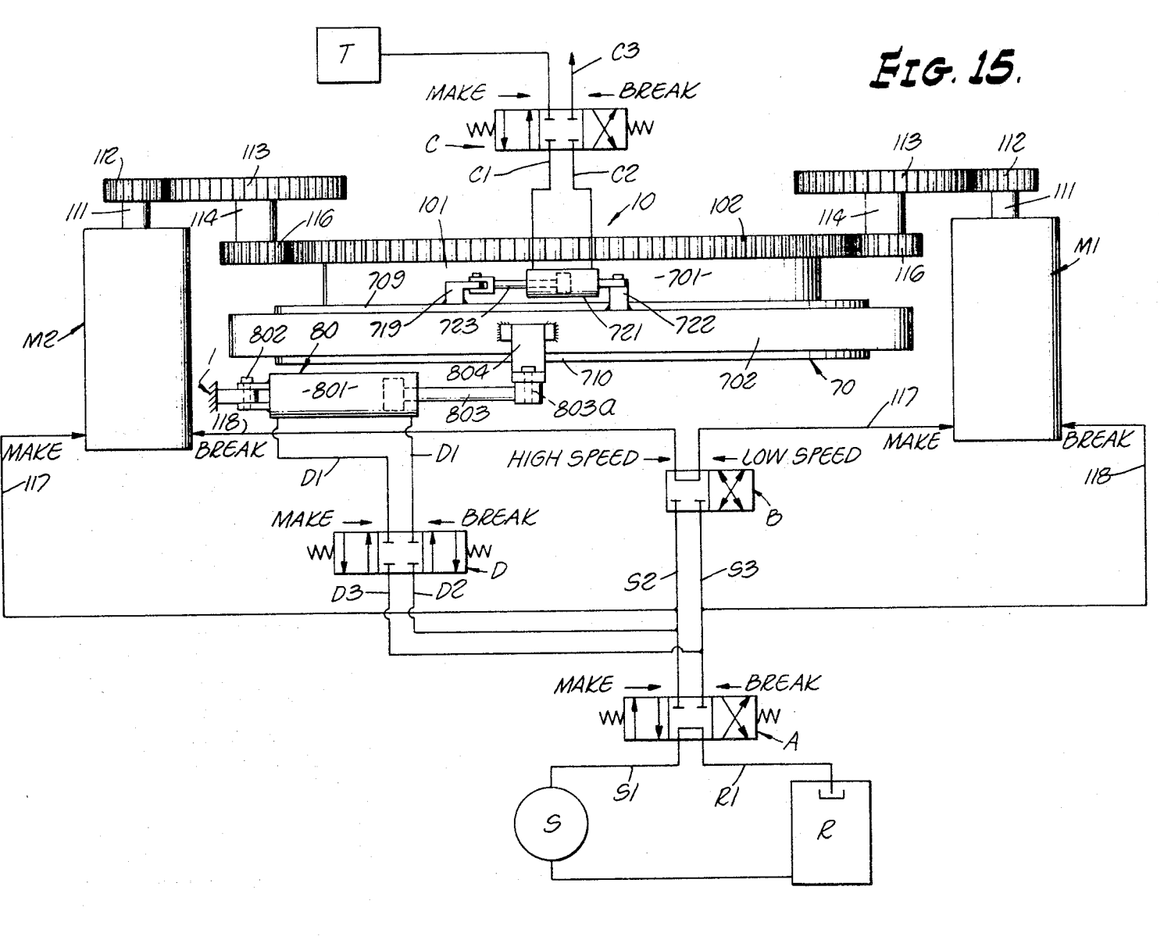
FIG. 15 is a schematic illustration of the selective motor drive for the tong.

FIG. 15 is illustrative of a control system for effecting such operation. In this view, only the major components are shown for clarity, and only one actuator cylinder 801 is shown since both cylinders 801 function similarly.

Generally, to effect operation of the tong in the desired mode and sense, it is necessary that a number of control functions be accomplished, namely, (a) for any mode of operation the flow of fluid to the conduits 117 and 118 of the motors M1 and M2 must be in the proper direction, to effect either make up or break out operations depending upon the direction of rotation of the motors; (b) for either sense of operation of the motors M1 and M2, the fluid must be controlled so as to be supplied primarily to one motor or so as to be divided between the two motors to produce different torque values; (c) when the over-running clutch means 70 is to be actuated, the supply of fluid to the clutch engaging cylinder 721 must be directed so as to shift the roller carrier rings in the proper direction to engage the clutch for subsequent angular motion of the clutch ring 702 in the proper direction; and (d) the supply of fluid to the actuator cylinders 801 which shift the clutch ring 702 angularly must be controlled to effect the desired extension or retraction of the actuator rod 803.

Accordingly, as seen in FIG. 15, hydraulic fluid is adapted to be supplied to the tong apparatus by means of a source of fluid under pressure, such as a pump S which takes fluid from a reservoir or sump R. Fluid is supplied by the pump S to a control valve A which is illustratively of the spring centered type having a center position at which fluid flows from the source S through a conduit S1 to a return conduit R1. When it is desired to drive the outer ring 10 of the tong in a clockwise or make up direction, the valve A is shifted to the right to a "MAKE" position, as indicated by the legend and arrow, at which fluid will flow from conduit S1 to a valve conduit S2 which is connected to the supply conduit 117 of the motor M2 to drive the latter. From the motor M2, fluid will flow through the conduit 118 to a control valve B which is adapted to be positioned in either of two positions, namely, the position shown, at which fluid flows therethrough to the conduit 117 of the other motor M1, or the alternate position indicated by the arrow, at which, fluid discharging from the conduit 118 of motor M2 will flow through a valve conduit S3 and thence through valve A to the sump R, and at which latter position half of the fluid flowing to the motor M2 from valve conduit S2 will flow through the conduit 117 of motor M1, whereby the motors M1 and M2 effectively operate in parallel. The same selection of high or low speed operation is also available when valve A is shifted, as shown by the arrow, to the "BREAK" position, at which the flow of power fluid is reversed, and is supplied to the conduit 117 of motor M1, first, or the flow is split by the valve B between motors M1 and M2.

When the ratchet or over-running clutch means 70 is to be engaged to enable high torque angular shifting of the outer ring 10, the clutch engaging means comprising the cylinder 721 and the rod 723 are operated by a fluid, preferably air, supplied from a source tank T through a control valve C. This control valve C is illustrated as having a spring biased center or off position, as well as "MAKE" and "BREAK" positions, indicated by the legends and arrows, whereby the flow of air may be selectively directed to the opposite ends of the cylinder 721 by conduits C1 and C2 and the other end of the cylinder exhausted through a port C3 of the valve C. Thus, the roller carrying rings 709 and 710 can be angularly shifted relative to the clutch ring 702 to engage the clutch for transmitting torque from the ring 702 to the outer ring 10 in either direction.

The actuation of the clutch ring 702 angularly by the actuator means 80 is under the control of a valve D which is interposed between a pair of conduits D1 which are connected to opposite ends of the cylinders 801, only one of which is shown, and conduits D2 and D3 which are respectively connected to the valve conduits S2 and S3 which extend between the make up and break out control valve means A, the motors M1 and M2, and the high and low speed selector valve means B. The valve D has a spring biased off or central position, and selective "MAKE" and "BREAK" positions, as indicated by the legends and arrows, at which fluid from conduits D2 and D3 directed to a selected end of the respective actuator cylinders 801 and discharged from the other end thereof to shift the clutch ring angularly in a desired direction. In order to condition the actuator means 80 for desired operation, the actuator rods 803 must be initially extended from the cylinders 801 for make up operation and initially retracted for break out operation. Such initial conditioning is simply accomplished by moving both of the valves A and D to their "BREAK" positions to condition the actuator means for make up operations or to their "MAKE" positions to condition the actuator means for break out operation.

OPERATION

In the operation of the tong assembly described above, assuming that the reverse stop means 60 and the actuator means 80 are both conditioned to make up pipe joints, as illustrated, a pipe P is stabbed into another pipe held stationary in suitable apparatus (not shown) below the tong assembly.

Fluid under pressure is then supplied to the motors M1 and M2, say in series, by positioning the make up and break out control valve A in the "MAKE" position and the speed or torque control valve means B in the "HIGH SPEED" position, to effect relatively high speed rotation of the outer ring 10 through the gearing 112, 113, 116 and 102, to drive the outer ring 10 in a clockwise direction. The brake means 50 will hold the inner ring against rotation, so that the cam surfaces 109a of the outer ring will cam the rollers 303 and the jaws 30 inwardly into pipe engaging positions, as seen in FIG. 11. Ultimately, the gripping effect of the dies 305 on the pipe P, overcomes the holding effect of the brake means 50, so that the inner ring 20, jaws 30, and outer ring 10 will all rotate as a unit, until the resistance to rotation of the pipe overcomes the torque capacity of the motor system, say when the usual joint in the pipe shoulders or is initially made up.

If thread friction precludes operation of the tong at high speed, say, in the case of severe side load on drill pipe or collar joints, or in the case of tapered casing joints, and greater torque is desired, it is only necessary to shift the speed control valve B to its "LOW SPEED" position, thereby splitting the fluid flow between the two motors M1 and M2 and substantially doubling the torque applied to the pipe by the tong.

In order to employ the ratchet or over-running clutch means 70 to apply a greater force to the outer ring 10 than can be applied through the motors M1 and M2, say, after drill pipe or collar joints have shouldered, the actuator cylinder 721 is supplied with fluid to retract the rod 723 from the position shown in FIG. 5 to the position shown in FIG. 11 by shifting the clutch engaging control valve C to its "MAKE" position. Such retraction of the rod 723 moves the roller carrying rings 709, 710 and the rollers 706 in the counter-clockwise direction, resulting in compression of the spring 715a by the pusher arm 719, and the wedging of the rollers 706 between the ramp seats 705a and the outer cylindrical wall 701 of the outer ring body 101. Then, fluid applied to the actuator cylinders 801 of the actuator means 80, responsive to movement of the actuator control valve D to the "MAKE" position, to retract the rods 803, will move the ratchet or clutch ring 702 in a clockwise direction, as seen in FIG. 11, such motion being transmitted through the engaged clutch rollers to the outer ring 10, and thence to the inner ring 20 and the jaws 30 to rotate the pipe P. Since the application of high torque to the pipe occurs while the pipe is gripped by the jaws 30 responsive to the torque applied to the outer ring 10 by the motors M1 and M2, or the motor M1, the grip on the pipe is not relaxed, as the mode of force application changes, resulting in the maintenance of the grip and reduced tendency of the jaws to skid on the pipe. This results in improved die life and less damage to the pipe.

Following the final make up of the joint, the actuator cylinders 801 and 721 of the ratchet means are neutralized by movement of the valves D and C, respectively, to their normal or off positions, and the spring 715a will neutralize the rollers 706. Reverse rotation of the outer ring 10 is then effected by the motors M1 and/or M2 by shifting the control valve A to the "BREAK" position, the brake means 50 holding the inner ring against rotation, and the cam lug 306 on the jaws 30 retracting the jaws 30, as the outer ring 10 rotates in a counter-clockwise direction. When the jaws are fully retracted, the traveling stop 601 of the reverse stop means will again be in the position shown in FIGS. 3 and 6, in engagement with the portion 603a of the stop body 603, and further rotation of the outer ring 10 in the counter-clockwise direction will cause similar rotation of the inner ring 20, with the jaws fully retracted.

In order to condition the assembly to break out pipe joints, it is only necessary to actuate the reverse stop shifter lug 613 to the broken line position of FIG. 10, while the outer ring 10 and inner ring 20 are rotating together in the counter-clockwise direction, and the lug 613 will engage portion 613a of the stop body 603 to rock it to the alternate position, at which the outer ring 10 is free for angular movement in the counter-clockwise direction relative to the inner ring 20, whereby to effect closure of the jaws 30 in response to rotation in that sense. In addition, the actuator rods 803 of the actuator means 80 are shifted to initially retracted positions, as previously described.

We claim:

1. A power pipe tong assembly for making up and breaking out pipe joints comprising: rotatable pipe gripping means including jaws movable inwardly to pipe gripping positions and outwardly to retracted positions, drive means operatively associated with said pipe gripping means for rotating said pipe gripping means and actuating said jaws to said pipe gripping positions, said drive means including motor means for rotating said pipe gripping means, over-running clutch means selectively engageable with said pipe gripping means, and actuator means connected to said over-running clutch means for shifting said over-running clutch means and said pipe gripping means angularly when said over-running clutch means is engaged.

2. A power pipe tong as defined in claim 1, wherein said pipe gripping means includes a ring having an annular body portion, said over-running clutch means including a drive ring extended about said body portion, and clutch elements interposed between said body portion and said drive ring.

3. A power pipe tong as defined in claim 1, wherein said pipe gripping means includes a ring having an annular body portion, said over-running clutch means including a drive ring extended about said body portion, clutch elements interposed between said body portion and said drive ring, clutch engaging means including means for angularly moving said drive ring in either direction relative to said body portion to engage said clutch elements between said body portion and said drive ring, and said actuator means including ram means for forcing said drive ring and said pipe gripping means in the other direction.

4. A power pipe tong as defined in claim 1, wherein said pipe gripping means includes a ring gear having a toothed portion and an annular body portion axially spaced from said toothed portion, said over-running clutch means including a drive ring extended about said body portion of said gear, and clutch elements interposed between said body portion of said gear and said drive ring, and said actuator means includes ram means for forcing said drive ring and said gear angularly in either direction when said clutch elements are engaged between said body portion of said gear and said drive ring.

5. A power pipe tong as defined in claim 1, wherein said pipe gripping means includes a ring gear having a toothed portion and an annular body portion axially spaced from said toothed portion, said motor means being geared to said toothed portion, said over-running clutch means including a drive ring extended about said body portion of said gear, and clutch elements interposed between said body portion of said gear and said drive ring, and said actuator means includes ram means for forcing said drive ring and said gear angularly in either direction when said clutch elements are engaged between said body portion of said gear and said drive ring.

6. A power pipe tong as defined in claim 1, wherein said pipe gripping means includes a ring having an annular body portion, said over-running clutch means including a drive ring extended about said body portion, one of said drive ring and said body portion having oppositely ramped seats, the other of said drive ring and said body portion having an annular surface opposed to said seats, and roller clutch elements in said seats engageable between said annular surface, and the ramps of said seats to transmit angular movement from said drive ring to said pipe gripping means in either direction.

7. A power pipe tong as defined in claim 1, wherein said pipe gripping means includes a ring having an annular body portion, said over-running clutch means including a drive ring extended about said body portion, one of said drive ring and said body portion having oppositely ramped seats, the other of said drive ring and said body portion having an annular surface opposed to said seats, and roller clutch elements in said seats engageable between said annular surface and the ramps of said seats to transmit angular movement from said drive ring to said pipe gripping means in either direction, said actuator means including ram means for forcing said drive ring and said pipe gripping means angularly in either direction when said clutch elements are engaged between said ramped seats and said annular surface.

8. A power pipe tong as defined in claim 1, wherein said pipe gripping means includes a ring having an annular body portion, said over-running clutch means including a drive ring extended about said body portion, one of said drive ring and said body portion having oppositely ramped seats, the other of said drive ring and said body portion having an annular surface opposed to said seats, roller clutch elements in said seats engageable between said annular surface and the ramps of said seats to transmit angular movement from said drive ring to said pipe gripping means in either direction, clutch engaging means for effecting engagement of said clutch elements between said ramped seats and said annular surface, and said actuator means including ram means for forcing said drive ring and said pipe gripping means angularly in either direction when said clutch elements are engaged between said ramped seats and said annular surface.

9. A power pipe tong as defined in claim 1, wherein said pipe gripping means includes a ring having an annular body portion, said over-running clutch means including a drive ring extended about said body portion, one of said drive ring and said body portion having oppositely ramped seats, the other of said drive ring and said body portion having an annular surface opposed to said seats, roller clutch elements in said seats engageable between said annular surface and the ramps of said seats to transmit angular movement from said drive ring to said pipe gripping means in either direction, clutch engaging means including ram means connected to said drive ring and to said clutch elements to effect engagement of said clutch elements between said ramped seats and said annular surface, and said actuator means including additional ram means for forcing said drive ring and said pipe gripping means angularly in either direction when said clutch elements are engaged between said ramped seats and said annular surface.

10. A power pipe tong as defined in claim 1, wherein said pipe gripping means includes a ring having an annular body portion, said over-running clutch means including a drive ring extended about said body portion, one of said drive ring and said body portion having oppositely ramped seats, the other of said drive ring and said body portion having an annular surface opposed to said seats, roller clutch elements in said seats engageable between said annular surface and the ramps of said seats to transmit angular movement from said drive ring to said pipe gripping means in either direction, resilient means connected to said clutch elements and to said drive ring for normally centralizing said clutch elements with respect to said seats, means for effecting engagement of said clutch elements between said ramped seats and said annular surface, and said actuator means including ram means for forcing said drive ring and said pipe gripping means angularly in either direction when said clutch elements are engaged between said ramped seats and said annular surface.

11. A power pipe tong as defined in claim 1, wherein said pipe gripping means includes an annular body portion, said over-running clutch means including a drive ring extended about said body portion, one of said drive ring and said body portion having a plurality of circumferentially spaced oppositely ramped seats, the other of said drive ring and said body portion having an annular surface opposed to said seats, roller clutch elements in said seats engageable between said annular surface and the ramps of said seats to transmit angular movement from said drive ring to said pipe gripping means in either direction, roller supporting ring means shiftably mounted for angular movement relative to said drive ring and supporting said rollers in said seats, and clutch engaging means for shifting said roller supporting ring means angularly in either direction relative to said drive ring to engage said rollers with one of said ramps of said seats.

12. A power pipe tong as defined in claim 1, wherein said pipe gripping means includes a driven gear having a toothed portion and an annular body portion axially spaced from said toothed portion, said motor means being geared to said gear to rotate the latter in either direction, said over-running clutch means including a drive ring extended about said body portion of said gear, one of said drive ring and said body portion of said gear having a plurality of circumferentially spaced oppositely ramped seats, the other of said drive ring and said body portion of said gear having an annular surface opposed to said seats, roller clutch elements in said seats engageable between said annular surface and the ramps of said seats to transmit angular movement from said drive ring to said gear in either direction, roller supporting ring means shiftably mounted for angular movement relative to said drive ring and supporting said rollers in said seats, and means for shifting said roller supporting ring means angularly in either direction relative to said drive ring to engage said rollers with one of said ramps of said seats, and said actuator means includes ram means for angularly shifting said drive ring and said gear in either opposite direction.

13. A power pipe tong as defined in claim 12, wherein said means for shifting said roller supporting ring means angularly includes a ram connected to said roller supporting ring means and to said drive ring.

14. A power pipe tong as defined in claim 12, wherein said means for shifting said roller supporting ring means angularly includes a ram connected to said roller supporting ring means and to said drive ring, and including resilient means for biasing said roller supporting ring means and said drive ring to positions at which said roller clutch elements are centralized in said seats to allow rotation of said gear relative to said drive ring.

15. A power pipe tong as defined in claim 12, wherein said means for shifting said roller supporting ring means angularly includes a ram connected to said roller supporting ring means and to said drive ring, and including spring means engaged between said roller supporting ring means and said drive ring for moving said roller supporting ring means to a position relative to said drive ring with said roller clutch elements centralized in said seats to allow rotation of said gear relative to said drive ring.

16. A power pipe tong as defined in claim 12, wherein said roller supporting ring means comprises upper and lower ring members extending about said body portion of said gear, said ring members having aligned openings, and said roller clutch elements having shafts extending into said aligned openings to connect said roller clutch elements to said ring members for angular movement about said body portion of said gear when said roller clutch elements are centralized in said seats and for radial movement into engagement between one of the ramps of said seats and said annular surface when said ring members are moved angularly relative to said body portion of said gear.

17. A power pipe tong as defined in claim 12, wherein said roller supporting ring means comprises upper and lower ring members extending about said body portion of said gear, said ring members having aligned openings, said roller clutch elements having shafts extending into said aligned openings to connect said roller clutch elements to said ring member for angular movement about said body portion of said gear when said roller clutch elements are centralized in said seats and for radial movement into engagement between one of the ramps of said seats and said annular surface when said ring members are moved angularly relative to said body portion of said gear, and means for resiliently biasing said roller supporting ring means and said drive ring to relative positions at which said roller clutch elements are centralized in said seats.

18. A power pipe tong as defined in claim 1, wherein said motor means includes first and second motors drivingly connected to said pipe gripping means, and motor control means for selectively operating one of said motors and both of said motors, to drive said pipe gripping means at high speed and low torque and lower speed and higher torque, said actuator means acting to drive said over-running clutch means and said pipe gripping means when said motor means stalls.

19. A power pipe tong as defined in claim 1, wherein said pipe gripping means is rotatable in opposite directions, said motor means including first and second motors drivingly connected to said pipe gripping means, and motor control means for selectively operating said motors in either direction and for selectively operating one of said motors and both of said motors together, to drive said pipe gripping means in either direction at high speed and low torque and lower speed and higher torque, said actuator means acting to drive said over-running clutch means and said pipe gripping means when said motor means stalls.

20. A power pipe tong as defined in claim 1, wherein said pipe gripping means is rotatable in opposite directions, said motor means including first and second reversible hydraulic motors drivingly connected to said pipe gripping means, a source of fluid under pressure, and control valve means for effecting the supply of fluid from said source to either of said motors to drive said pipe gripping means in either direction by one of said motors and for effecting a divsion in the supply of fluid from said source between both of said motors to drive said pipe gripping means in either direction by both of said motors, said actuator means acting to drive said over-running clutch means and said pipe gripping means in either direction when said motor means stalls.

21. A power pipe tong as defined in claim 20, wherein said control valve means includes means for effecting the series flow of fluid through said motors when one of said motors is driving said pipe gripping means.

22. A power pipe tong as defined in claim 1, wherein said pipe gripping means includes an outer ring drivingly engaged by said motor means for rotating said outer ring in either direction, an inner ring, said jaws being jaws shiftably carried by said inner ring, cam and follower means on said outer ring and said jaws for moving said jaws to said pipe gripping positions upon rotation of said outer ring relative to said inner ring in either direction, said motor means including first and second reversible hydraulic motors, a source of fluid under pressure, and control valve means for effecting the supply of fluid from said source to either of said motors to drive said pipe gripping means in either direction by one of said motors and for effecting a division in the supply of fluid from said source between both of said motors to drive said pipe gripping means in either direction by both of said motors, said actuator means acting to drive said over-running clutch means and said pipe gripping means in either direction when said motor means stalls.

23. In a power pipe tong assembly for making up and breaking out pipe joints, a housing having a pipe opening, an inner ring in said housing circumscribing said opening and having jaws shiftably carried thereby for movements between retracted postions and pipe gripping positions, an outer ring revolvably supported in said housing and extended about said inner ring, said outer ring and said jaws having cam and follower means for shifting said jaws to said pipe gripping positions from said retracted positions responsive to angular movement of said outer ring relative to said inner ring in either direction, and fluid motor means for driving said outer ring angularly, the improvement comprising a drive ring extended about said outer ring, means for shifting said drive ring angularly in either direction, and normally released means between said drive ring and said outer ring operable upon engagement to transmit angular movement from said drive ring to said outer ring.

24. A power pipe tong as defined in claim 23, wherein said normally released means includes roller clutch elements between said drive ring and said outer ring, and means for effecting engagement of said roller clutch elements between said rings.

25. A power pipe tong as defined in claim 23, wherein said normally released means includes roller clutch elements between said drive ring and said outer ring, and means for effecting engagement of said roller clutch elements between said rings, said fluid motor means including an output gear, said outer ring having gear teeth thereon, and gear means drivingly connecting said output gear to said teeth.

26. A power pipe tong as defined in claim 23, wherein said means for shifting said drive ring angularly includes a pair of rams in said housing at opposite sides of and connected to said drive ring.

27. In a power pipe tong assembly for making up and breaking out pipe joints, rotatable pipe gripping means including jaws shiftable between retracted positions and pipe engaging positions responsive to rotation of said pipe gripping means in ether direction, power means including a pair of reversible hydraulic motors connected to said pipe gripping means for rotating the latter in opposite directions, a source of fluid to drive said motors, and control means for selectively controlling the flow of fluid to said motors to drive said pipe gripping means at high speed and low torque by one of said motors and at lower speed and higher torque by both of said motors, the improvement wherein said control means includes means for selectively directing fluid to said motors in series and in parallel and opposite directions.

28. A power pipe tong as defined in claim 27, wherein said control means includes valve means for directing fluid from said source to one of said motors and from said one of said motors to the other of said motors in either direction in one position of said valve means, and for splitting the flow of fluid between said motors in another position of said valve means.

References Cited

UNITED STATES PATENTS

| | | | |
|---|---|---|---|
| 3,086,413 | 4/1963 | Mason | 81—57.16 |
| 3,041,901 | 7/1962 | Knights | 81—57.2 X |
| 3,518,903 | 7/1970 | Ham et al. | 81—57.16 |
| 3,548,692 | 12/1970 | Dickmann | 81—57.18 |

JAMES L. JONES, Jr., Primary Examiner

U.S. Cl. X.R.

81—57.22; 173—164